April 7, 1925.  J. H. BERTRAND, JR  1,532,673
AUTOMOBILE BUMPER
Filed June 6, 1924

Joseph H. Bertrand Jr.
INVENTOR.

BY Ernest D. Jansen
ATTORNEY.

Patented Apr. 7, 1925.

1,532,673

UNITED STATES PATENT OFFICE.

JOSEPH H. BERTRAND, JR., OF ALBANY, NEW YORK.

AUTOMOBILE BUMPER.

Application filed June 6, 1924. Serial No. 718,403.

*To all whom it may concern:*

Be it known that I, JOSEPH H. BERTRAND, Jr., a citizen of the United States, residing at Albany, in the county of Albany and State of New York, have invented certain new and useful Improvements in Automobile Bumpers, of which the following is a specification.

My invention relates to automobile bumpers, and the object of my invention is to provide a strong spring type bumper which will be comparatively rigid at the center and increasingly flexible as the ends thereof are neared; a bumper composed of parts or members so shaped that they may be so assembled as to form a number of differently designed bumpers; and all parts of which will be comparatively simple and inexpensive to manufacture.

Figure 1:
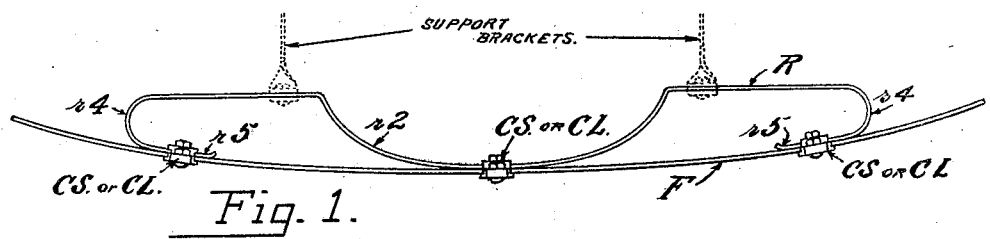
Figure 2:
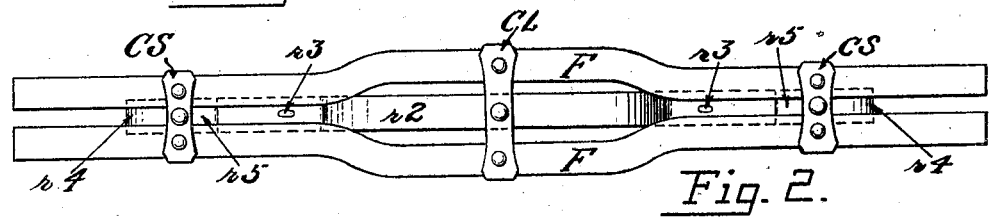
Figure 3:
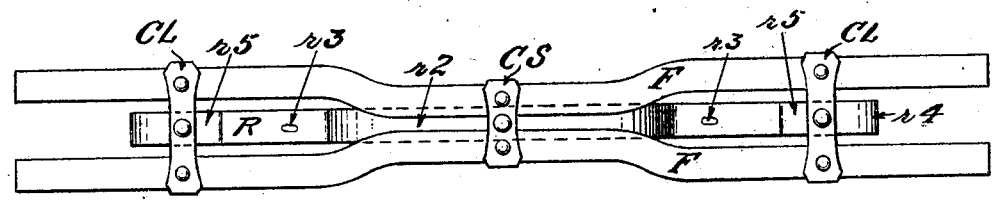
Figure 4:
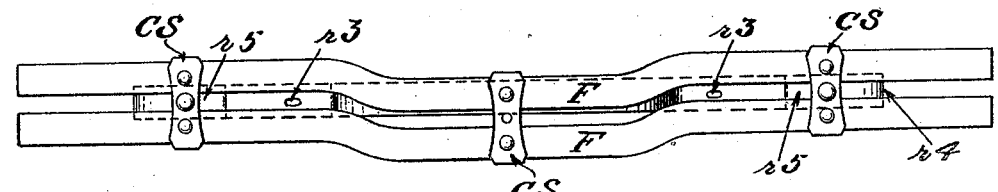

The manner in which I accomplish my object is illustrated in the accompanying drawings, in which:

Fig. 1 is a plan view, and Figs. 2, 3, and 4 are front elevations, each showing a different form which may be assembled from one shape or design of parts.

Referring to the drawings, it will be plainly seen that the parts or members of my improved bumper are all of simple design, and such as are comparatively inexpensive to manufacture. The bumper bars or impact receiving members F, F, and the rear or supporting member R, are of resilient material, and the general construction is similar to that shown in the pending application Serial No. 704,504, this present invention being a further improvement in the type of bumper illustrated therein.

As in the pending application, supra, the central portion $r^2$, of the rear or supporting member R, curves forward between the points $r^3$, $r^3$, (where the usual supporting brackets, indicated by dotted lines in Fig. 1, are to be attached in any suitable manner, as by rivets or bolts) so as to form an arch the center of which will contract with, and so reinforce the center portion of the front members F.

Outwardly from the attaching points, as at $r^4$, about midway between those points and the ends of the bumper, the member R, is bent back upon itself, on a radius, as illustrated, so that the ends in effect are a pair of U-shaped springs. The front members of my improved bumper are substantially identically shaped flat bars F, F, bent into the form of a flat arc substantially as illustrated in Fig. 1 of the drawings, the central portions thereof being offset edgewise somewhat as illustrated in Figs. 2, 3 and 4. Suitable cross bar (or clamps) CS., adapted to hold a pair of the bars F in spaced relation to each other and against the front of the member R, when the space between the bars F. is less than the width of the member R; and suitable cross bars (or clamps) CL., adapted to hold a pair of bars F, in spaced relation to each other, and to be fastened to the member R, provide simple means whereby a pair of shaped bars F may be easily assembled to produce a number of different designs without change in the design of the parts. I prefer to fasten the parts together by means of suitable bolts, but I may use rivets if I so desire.

By making my bumper as illustrated and described, a single form of rear member R, a single form of front member F, and two lengths of cross bars (or clamps) CS., and CL., together with the required bolts or rivets, enables me to construct the different designs illustrated in the drawings without the necessity of making and stocking a larger variety of parts.

I claim:

1. In an automobile bumper, the combination of a pair of substantially identically shaped flat spring front members in plan arcuate in form, in elevation horizontal, the central portion being offset edgewise; a flat spring rear member with a spaced pair of bracket attaching points between which is a forwardly curved arch adapted to be fastened to and reinforce the center of said front members, the portions of said rear member outside of said attaching points curved forward and inward to form U-shaped loops; a cross bar, with attaching means joining the center of said front members and attached to the center of the forwardly curved arch of said rear member; and cross bars, with attaching means, joining said front members at points intermediate the center and the ends thereof and attached to the free ends of said U-shaped loops.

2. In an automobile bumper; a flat spring rear member provided with spaced bracket attaching points between which is a forwardly curved arch, the ends of said member curved forwad and inward to form U-shaped loops; cross bars, with attaching means, one attached to the arched portion and one to the free end of the loops of said rear member; and a pair of substantially identically shaped flat spring front members, the central portion thereof offset edgewise, adapted to be attached to said cross bars with the offset either in the same or in reversed position relative to the horizontal axis of said front members.

3. In an automobile bumper; a flat spring rear member provided with spaced bracket attaching points between which is a forwardly curved arch, the ends of said member curved forward and inward to form U-shaped loops; cross bars with attaching means, attached to the free ends of the loops of said rear member; and a pair of substantially identically shaped flat spring front members, the central portion thereof offset edgewise, adapted to be attached to said cross bars with the offset either in the same or in reversed position relative to the horizontal axis of said front members.

In testimony whereof I have affixed my signature.

JOSEPH H. BERTRAND, Jr.